(12) United States Patent
Yamane et al.

(10) Patent No.: US 6,671,872 B1
(45) Date of Patent: *Dec. 30, 2003

(54) PROGRAMS MAINTENANCE PROCEDURES IN PARALLEL PROCESSING SYSTEM

(75) Inventors: Yasuhito Yamane, Yokohama (JP); Katsuhide Takagi, Fujisawa (JP); Masako Kamegi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,017

(22) Filed: Dec. 10, 1999

Related U.S. Application Data

(63) Continuation of application No. 08/880,434, filed on Jun. 23, 1997, now Pat. No. 6,075,930.

(30) Foreign Application Priority Data

Jun. 24, 1996 (JP) ............................................. 8-163171

(51) Int. Cl.[7] .................................................. G06F 9/45
(52) U.S. Cl. ............................. 717/110; 707/8; 707/9; 707/203
(58) Field of Search ........................ 717/110–113, 120, 717/121; 707/8, 9, 203; 709/102, 103, 213, 217, 312, 313; 345/733, 740, 741, 743, 748, 751

(56) References Cited

U.S. PATENT DOCUMENTS

| | | | | |
|---|---|---|---|---|
| 4,733,347 A | * | 3/1988 | Fukuoka | 709/106 |
| 5,263,155 A | | 11/1993 | Wang | 707/8 |
| 5,321,832 A | * | 6/1994 | Tanaka et al. | 707/204 |
| 5,327,556 A | | 7/1994 | Mohan et al. | 707/8 |
| 5,408,653 A | | 4/1995 | Josten et al. | 707/8 |
| 5,423,044 A | * | 6/1995 | Sutton et al. | 710/200 |
| 5,442,765 A | * | 8/1995 | Shiga | 707/8 |
| 5,539,909 A | * | 7/1996 | Tanaka et al. | 709/315 |
| 5,546,579 A | | 8/1996 | Josten et al. | 707/8 |
| 5,557,792 A | | 9/1996 | Josten et al. | 707/8 |
| 5,561,809 A | * | 10/1996 | Elko et al. | 709/213 |
| 5,592,664 A | * | 1/1997 | Starkey | 707/1 |
| 5,625,815 A | | 4/1997 | Maier et al. | 707/8 |
| 5,754,782 A | | 5/1998 | Masada | 709/213 |
| 5,819,044 A | * | 10/1998 | Kawabe et al. | 709/226 |
| 5,950,215 A | * | 9/1999 | Tabuchi | 717/515 |
| 6,075,930 A | * | 6/2000 | Yamane et al. | 707/8 |

FOREIGN PATENT DOCUMENTS

| | | |
|---|---|---|
| JP | 3-19068 | 1/1990 |
| JP | 2-224051 | 9/1990 |
| JP | 3-28956 | 2/1991 |
| JP | 3-263163 | 11/1991 |
| JP | 5-46566 | 2/1993 |
| JP | PTO99-1607 | 2/1999 |

* cited by examiner

Primary Examiner—John Chavis
(74) Attorney, Agent, or Firm—Mattingly, Stanger & Malur, P.C.

(57) ABSTRACT

A parallel processing system has a plurality of subsystems connected to each other to operate as a single system. The subsystems each include a variety of procedures that are selectively created, used, updated and deleted by a program in execution. A procedure management unit is capable of controlling state attributes of the procedures. In particular, the procedure management unit has a procedure-being-used table for cataloging the names of procedures currently being used by programs in execution and a procedure-being-updated table for cataloging the names of procedures currently being created or updated by programs in execution. Whether or not the name of a procedure is cataloged in the procedure being used table, a request to use the procedure is granted if the procedure name is not cataloged in the procedure being updated table. However, if the name of a procedure is cataloged in either one of the tables according to the procedure management unit, then requests to update, create and delete the procedures are denied. Conversely if it is determined that the name of a particular procedure is not cataloged in either of the procedure being used or the procedure being updated table in all of the subsystems, then requests for creating, updating and deleting the procedure are granted to programs in execution.

9 Claims, 8 Drawing Sheets

PROGRAMS MAINTENANCE PROCEDURES IN PARALLEL PROCESSING SYSTEM

This is a continuation application of U.S. Ser. No. 08/880,434, filed Jun. 23, 1997, now U.S. Pat. No. 6,075,930.

FIELD OF THE INVENTION

The present invention relates in general to a parallel processing system and in particular to a parallel processing system that allows programs executing common procedures to carry out operations such as creation, use, updating and deletion of the procedures.

DESCRIPTION OF THE RELATED ART

In general, for processing that is to be carried out by a variety of programs executed in a conventional system, and in particular, for typical processing that is supposed to be carried out by the great majority of programs such as basic input/output processing or basic arithmetic processing, common standard procedures have been determined in advance. Some of the procedures impose the following conditions:

(1) A procedure can be used by a plurality of programs at the same time.

(2) When at least one program is using a procedure, an operation to update or delete the procedure by another program is absolutely prohibited.

(3) While a program is creating a procedure, an operation to create the procedure by another program is absolutely prohibited.

(4) While a program is updating a procedure, an operation to use, update and delete the procedure by another program is absolutely prohibited.

In one of the conventional techniques for executing sharing and exclusive control of the procedures having the conditions described above, the states of all procedures are controlled by one central procedure management unit. According to this conventional technique, the central procedure management unit controls the procedures by cataloging two types of state attributes in a procedure management table. One of the state attributes is 'a procedure-being-used state' which indicates that a procedure is being used by a program in execution. The other state attribute is 'a procedure-being-updated state' which indicates that a procedure is being created or updated by a program in execution.

FIG. 8 is a diagram showing a typical schematic configuration of a conventional parallel processing system. As shown in the figure, a plurality of subsystems are connected to each other through a special subsystem, which is a subsystem for management use. To be more specific, the special subsystem serves as a central subsystem for controlling the state attributes of the procedures. For example, when a program 33 in execution in a subsystem 30 shown in the figure wants to use a procedure for searching a database, the program 33 passes necessary information such as the name of the database to be searched and a search key to a procedure executing unit 32 to request the execution of the procedure. After receiving the information, the procedure executing unit 32 makes an inquiry about the state attribute of the procedure for searching the database to a procedure management unit 14 of the management subsystem 10 through a communication line 52. If the procedure management unit 14 informs that the procedure for searching the database is in a usable state, the procedure executing unit 32 executes the procedure. Later on, the procedure executing unit 32 delivers the desired results of the execution to the program 33 which has been waiting for the results.

SUMMARY OF THE INVENTION

As described above, the procedure management unit 14 of the management subsystem 10 serves as a central unit for controlling the states of all procedures in the parallel processing system. In this case, requests to form a judgment as to whether or not the creation, use, updating or deletion of a procedure is allowable, which are made by other subsystems, are all issued to the management subsystem. As a result, processing loads are concentrated at only the management subsystem and, in addition, a program in another subsystem must suspend its execution until the management subsystem notifies the program that the status as to the creation, use, updating or deletion of the procedure is allowable, giving rise to a problem that it is difficult to maintain the processing efficiency at a high level for both the individual programs and the parallel processing system as a whole. Further, since data communication takes place among the subsystems, accompanying the requests to form a judgment as to whether or not the creation, use, updating or deletion of a procedure is allowable, in particular, in the case of execution of a program making an attempt to use a procedure, the fast response of which is regarded as important, there is also encountered a problem that a late notification of the status of the procedure from the management subsystem has a bad effect on the turn-around time of the program. In addition, if a failure occurs in the management subsystem, causing the procedure management unit not to function correctly, the disabled procedure management unit gives rise to another problem of producing a bad effect on the other subsystems in that programs of the other subsystems can not utilize the common procedures any more.

It is thus an object of the present invention to solve the problems described above by providing a parallel processing system wherein, by preventing processing loads from being concentrated at a particular subsystem so as to eliminate a bad effect of the concentration of processing loads at a particular subsystem on the turn-around time of a program utilizing a procedure, the processing efficiency of the parallel processing system can be maintained at a high level and, even if a subsystem has to suspend its function, there will be no effect on the operation of the parallel processing system as a whole.

In order to achieve the object described above, the present invention provides a parallel processing system that has a plurality of subsystems connected to each other to operate as a single system wherein each of the subsystems has a variety of procedures which can be created, used, updated or deleted by a program in execution therein and are each used for implementing predetermined processing. For each subsystem, a procedure management unit is used for controlling the states of the procedures. The procedure management unit includes a procedure-being-used table for cataloging procedures currently being used by a program in execution and a procedure-being-updated table for cataloging procedures which are presently being created or updated by a program in execution.

In this way, the number of requests made to another subsystem to form a judgment as to whether or not the creation, use, updating or deletion of a procedure is allowable can be decreased. In addition, the frequency at which the execution of a program is suspended during the time it takes to wait for a response to the request from another subsystem can also be reduced. It is thus possible to eliminate the concentration of processing loads at a particular subsystem and a bad effect on the turn-round time of the program. As a result, the processing efficiency of the parallel processing system can be maintained at a high level and, even if a subsystem has to suspend its function, the effect of the suspension on the operation of the parallel processing system as a whole can be avoided.

DETAILED DESCRIPTION OF THE PREFERRED EMBODIMENTS

The present invention will become apparent from the following detailed description of the preferred embodiments with reference to the accompanying diagrams showing the embodiments.

Figure 1:
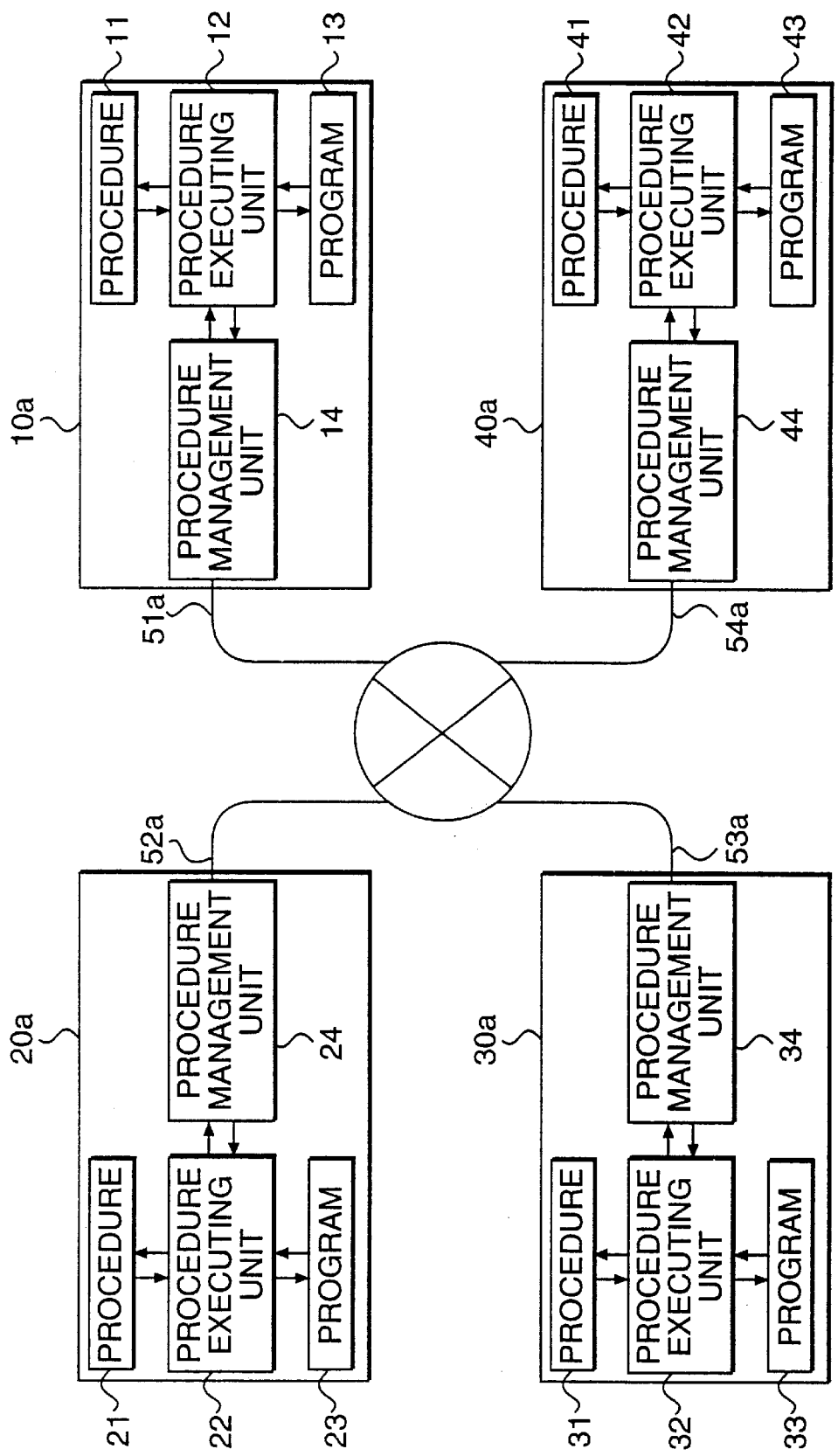
FIG. 1 is a block diagram showing the main elements of a basic configuration of an embodiment implemented by a parallel processing system provided by the present invention.
Figure 8:
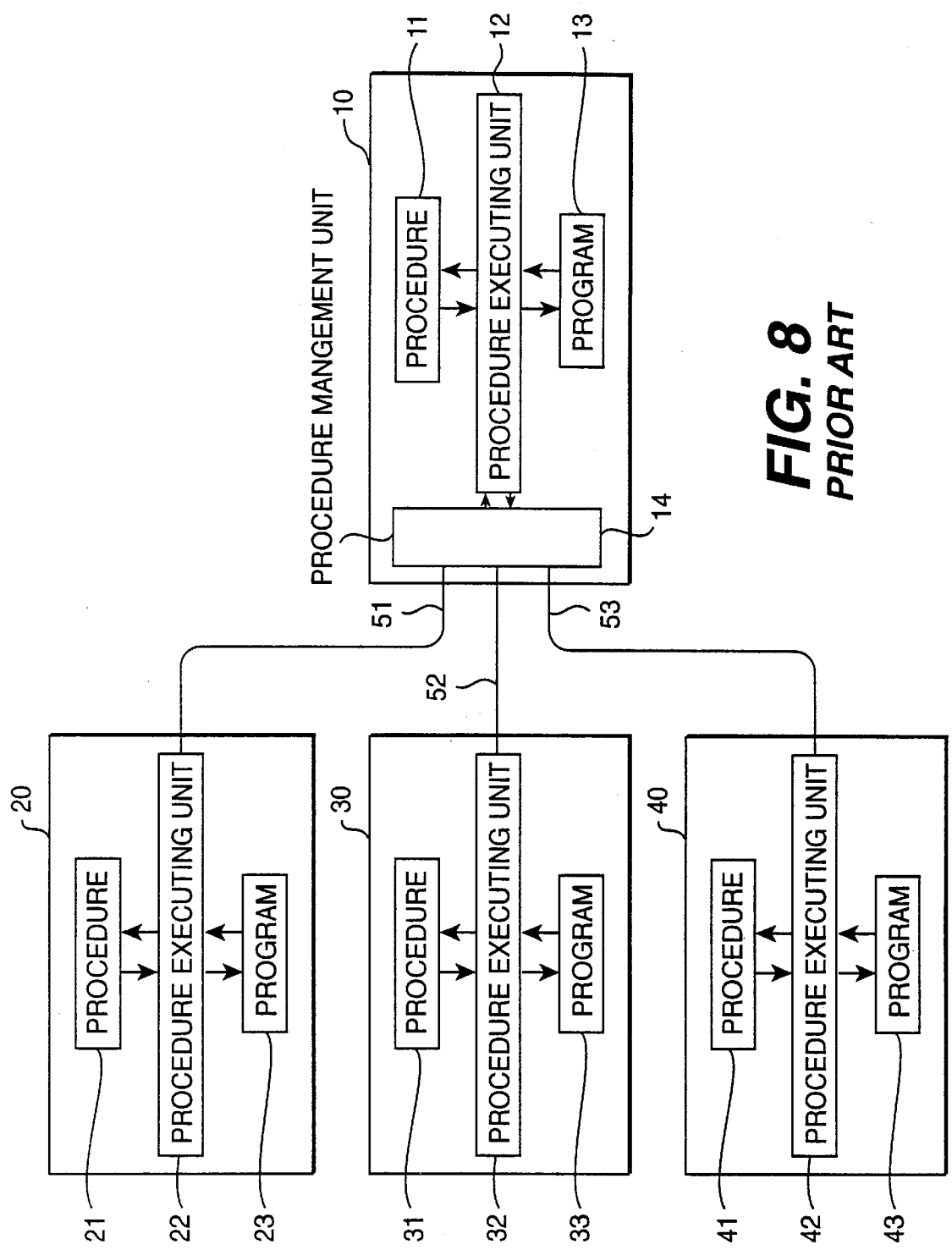
FIG. 8 is a diagram showing a typical schematic configuration of a conventional parallel processing system.

FIG. 1 is a block diagram showing the main elements of the basic configuration of an embodiment of the main components of a parallel processing system according to the invention. Such a system also includes I/O devices, such as a printer, terminal, monitor, keyboard, etc. and storage devices for storing software used in implementing the embodiments of the invention. Components identical with those of the conventional parallel processing system shown in FIG. 8 are each denoted by the same reference numeral as the ones shown in FIG. 8.

To be more specific, each subsystem 10a, 20a, 30a and 40a shown in FIG. 1 has a procedure 11, 21, 31 and 41, a procedure executing unit 12, 22, 32 and 42, a program 13, 23, 33 and 43 and a procedure management unit 14, 24, 34 and 44, respectively. As shown in the figure, the subsystems 10a, 20a, 30a and 40a which include respectively the procedure management units 12, 22, 32 and 42 having the same function are connected to each other by the communication lines 51a, 52a, 53a and 54a.

For example, when the program 33 in execution in the subsystem 30a shown in the figure wants to use a procedure for searching a database, the program 33 passes necessary information such as the name of the database to be searched and a search key to the procedure executing unit 32 to request the execution of the procedure. Receiving the information, the procedure executing unit 32 makes an inquiry about the state attribute of the procedure for searching the database to the procedure management unit 34 of the same subsystem 30a. If the procedure management unit 34 indicates that the procedure for searching the database is in a usable state, the procedure executing unit 32 executes the procedure. Later on, the procedure executing unit 32 delivers the desired results of the execution to the program 33, which has been waiting for the results.

In the parallel processing system provided by the present invention, the subsystems 10a, 20a, 30a and 40a each have respective procedure management units 14, 24, 34 and 44 which control the state attributes of their respective procedures. That is to say, unlike the conventional parallel processing system which has been described by referring to FIG. 8, when a procedure executing unit makes an inquiry about the state attribute of a procedure, the inquiry is not passed on to a procedure management unit of another subsystem. Instead, the inquiry is directed to the procedure management unit of a subsystem to which the procedure executing unit pertains.

Figure 2:
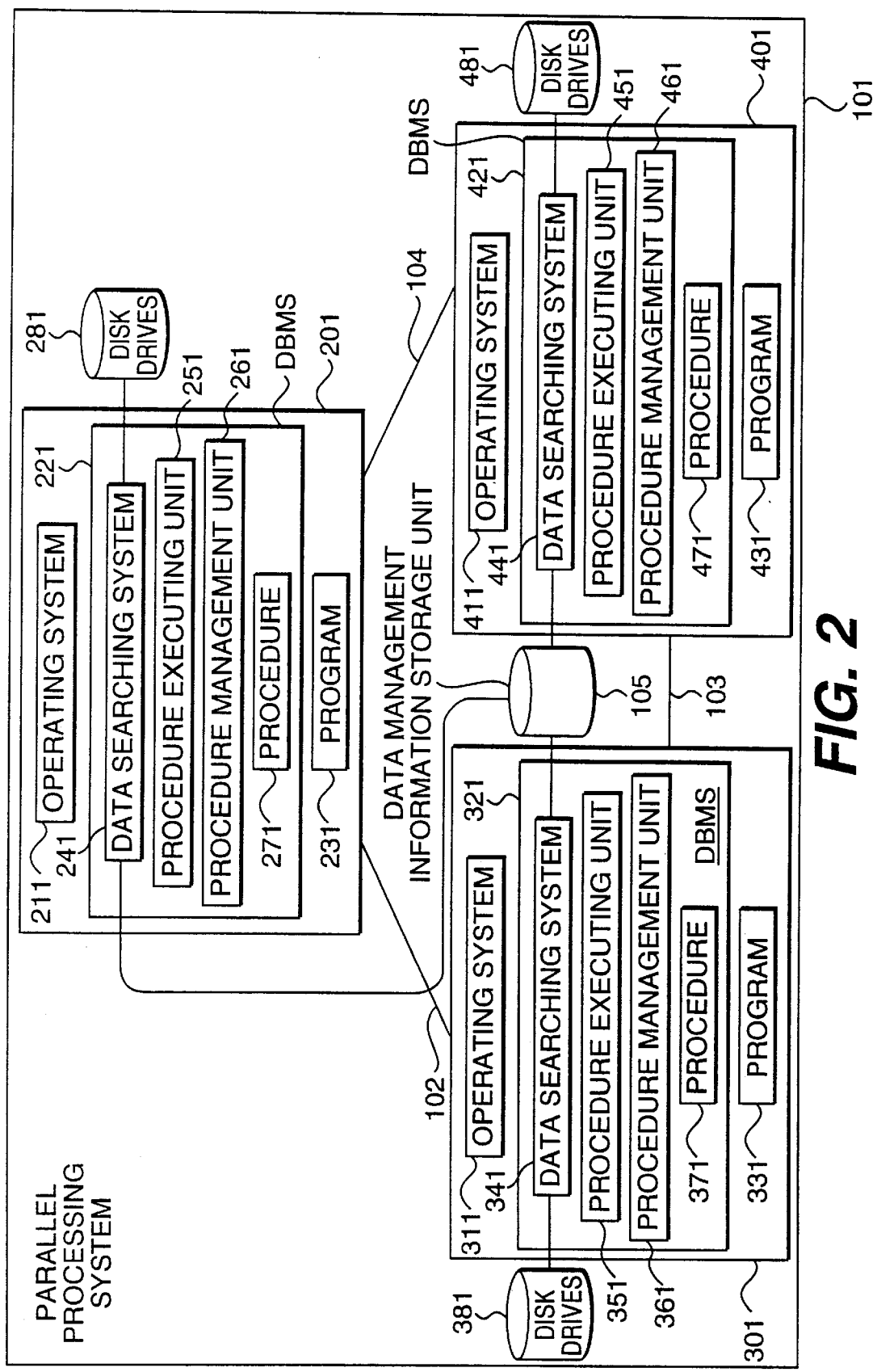
FIG. 2 is a block diagram showing the configuration of an embodiment of the invention implemented on the parallel processing system provided by the present invention.

FIG. 2 is a block diagram showing the configuration of the embodiment implemented in a parallel processing system 101 provided by the present invention. As shown in the figure, a plurality of systems capable of carrying out operations independently are connected to each other as subsystems to form a parallel processing system. Communication lines 102, 103 and 104 connect each of the subsystems together. A data management information storage unit 105 is connected to each of the subsystems.

Each subsystem 201, 301 and 401 has an operating system 211, 311 and 411, a data-base management system (DBMS) 221, 321 and 421 and a program 231, 331 and 431, respectively. Within each DBMS is a data searching system 241, 341 and 441, a procedure executing unit 251, 351 and 451, a procedure management unit 261, 361 and 461 and a procedure 271, 371 and 471. In addition, disk drives 281, 381 and 481 for storing data are provided to correspond with each of the subsystems.

The communication lines 102, 103 and 104 shown in FIG. 2 correspond to the communication lines 51a, 52a, 53a and 54a shown in FIG. 1 whereas the subsystems 201, 301 and 401 shown in FIG. 2 correspond to the subsystems 10a, 20a, 30a and 40a shown in FIG. 1. The programs 231, 331 and 431 shown in FIG. 2 correspond to the programs 13, 23, 33 and 43 shown in FIG. 1. The procedure executing units 251, 351 and 451 shown in FIG. 2 correspond to the procedure executing units 12, 22, 32 and 42 shown in FIG. 1. The procedure management units 261, 361 and 461 shown in FIG. 2 correspond to the procedure management units 14, 24, 34 and 44 shown in FIG. 1. Finally, the procedures 271, 371 and 471 shown in FIG. 2 correspond to the procedures 11, 21, 31 and 41 shown in FIG. 1.

The parallel processing system 101 shown in FIG. 2 includes the three subsystems 201, 301 and 401 connected to each other by communication lines 102, 103 and 104, however additional subsystems can be added. By linking together the DBMS 221 operating in the subsystem 201, the DBMS 321 operating in the subsystem 301 and the DBMS 421 operating in the subsystem 401 with each other in advance in a predetermined way, the DBMSes 221, 321 and 421 can all be operated as a single virtual parallel data-base management system executing in the parallel processing system 101 (relational database).

The DBMSes 221, 321 and 421 are associated with the disk drives 281, 381 and 481, respectively, and each include data and a basic procedure for accessing the data. A variety of information required for controlling the disk drives 281, 381 and 481 is stored as data management information 105 in the central data management information storage unit 105. The data management information 105 is information used in the integrated control of the virtual parallel data-base management system obtained as a result of the linking together of the databases mentioned above. By sharing the data management information 105 among the DBMSes 221, 321 and 421, data accesses can be coordinated and procedures for accessing the data can be shared by any of the subsystems.

Even though the programs 231, 331 and 431 are executed in the subsystems 201, 301 and 401 respectively, the programs 231, 331 and 431 can use the procedures cited above without regard to the subsystem to which the program in operation pertains, and are thus capable of accessing data controlled by the virtual parallel data-base management system. A procedure invoked by a program is loaded into a memory in the DBMS not shown in the figure at the time it is invoked. Procedures loaded in the memory are thereafter controlled by the procedure management unit. While a procedure is being used by a program, the procedure management unit does not let other programs delete or change the procedure in accordance with a procedural process to be described later.

For example, the following description explains a case in which the program 231 in execution in the subsystem 201 makes an attempt to access desired data by invoking the procedure 271. First of all, the DBMS 221 makes an inquiry to the procedure management unit 261 as to whether or not the procedure 271 is usable. If the procedure 271 is found usable and already loaded in the memory, the procedure 271 is used as it is to start the access to the desired data. If the procedure 271 is found usable but not loaded in the memory yet, however, the data searching system 241 finds a disk for storing the procedure 271 by referring to the data management information 105. For example, let the procedure 271 be stored in the disk drive 381. In this case, the procedure 271 is fetched from the disk drive 381 and then loaded into the memory by the procedure management unit 261. Thereafter, the procedure executing unit 251 uses the loaded procedure 271 to start the access to the desired data. If the procedure is found unusable, on the other hand, the requesting program 231 is notified of the fact that the procedure 271 is not usable by using an error message or the like.

In the parallel processing system provided by the present embodiment, since the DBMSes 221, 321 and 421 operate concurrently, it is quite within the bounds of possibility that requests to create, use, update and/or delete the same procedure are made by the DBMSes 221, 321 and 421 at the same time. For this reason, it is imperative that the integrity of each procedure be preserved so that an access to data by using the procedure always gives the same result, be the request made by the DBMS 221, 321 or 421. It is also necessary for each of the procedure management units 261, 361 and 461 of the DBMSes 221, 321 and 421 respectively to have a function for obtaining the state attribute of a procedure with a high degree of reliability at any time.

Figure 3:
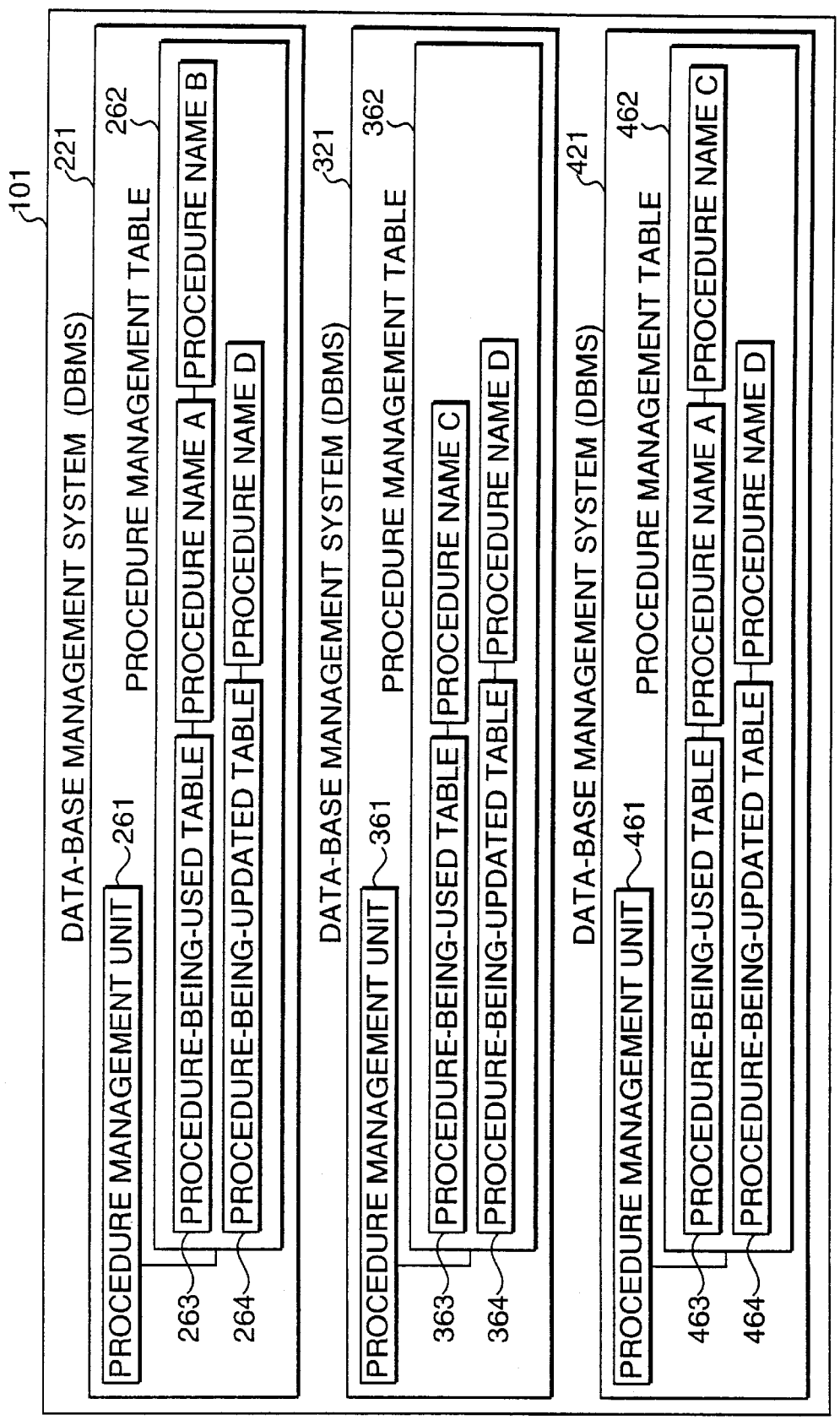
FIG. 3 is a block diagram showing a detailed configuration of the procedure management unit employed in the parallel processing system according to a preferred embodiment of the invention.

FIG. 3 is a block diagram showing a detailed configuration of the procedure management unit employed in the parallel processing system provided by the present embodiment. Reference numerals 262, 362 and 462 shown in the figure each denote a procedure management table whereas reference numerals 263, 363 and 463 are each a procedure-being-used table for cataloging the names of procedures currently being used whereas reference numerals 264, 364 and 464 are each a procedure-being-updated table for cataloging the names of procedures currently being created or update. It should be noted that elements identical with those shown in FIG. 2 are each denoted by the same reference numeral as the identical ones shown in FIG. 2 and therefore their explanation is omitted.

The procedure management unit shown in FIG. 3 controls the state attributes of the procedures provided by the parallel processing system, making a decision as to whether or not the processes of creation, use, updating and deletion of the procedures requested by the programs can be carried out. The following description explains the procedure management unit 261 associated with the DBMS 221, which is one of the DBMSes 221, 321 and 421.

The procedure management unit 261 has the procedure management table 262 for controlling the state attributes of a variety of procedures. The procedure management table 262 comprises two kinds of tables, that is, the procedure-being-used table 263 for controlling procedures being used and the procedure being-updated table 264 for controlling procedures being updated. In the procedure-being-used table 263, the unique names of procedures currently being used by the DBMS 221 are cataloged. In the procedure being-updated table 264, on the other hand, the unique names of procedures currently being updated or created by all of the DBMSes 221, 321 and 421 are cataloged. As shown in FIG. 3, the procedure management unit 261 of the DBMS 221 knows from the procedure-being-used table 263 that procedures of the DBMS 221 named A and B are currently being used; and from the procedure-being-updated table 264 that a procedure with a name D of the whole parallel processing system is now being created or updated.

A determination as to whether or not a procedure can be used is based on the state attribute indicating whether or not the procedure is now being created or updated. Thus, before using a procedure, it is necessary to refer to a procedure-being-updated table in the DBMS requesting the use of the procedure to find out whether or not the unique name of the procedure to be used has been cataloged in the table. In the case of the DBMS 221 shown in FIG. 3, for example, a procedure with a name C can be used because the name C is not cataloged in the procedure-being-updated table 264 of the DBMS 221. However, the procedure with the name D cannot be used because the name D has been cataloged in the procedure-being-updated table 264.

A determination as to whether or not a procedure can be created or updated is based on the state attribute of the procedure indicating whether or not the procedure is currently being used or the state attribute indicating whether or not the procedure is now being created or updated. Thus, before creating or updating a procedure, it is necessary to refer to the procedure-being-used tables in all of the DBMSes 221, 321 and 421 and a procedure-being-updated table in the DBMS requesting the creating or the updating of the procedure to find out whether or not the unique name of the procedure to be created or updated has been cataloged in the procedure-being-used tables or the procedure-being-updated tables.

Before updating the procedure with the name C in the DBMS 221 shown in FIG. 3, for example, it is necessary to refer to the procedure-being-used table 263 and the procedure-being-updated table 264 in the DMBS 221. It is also necessary to refer to the procedure-being-used table 363 in the DBMS 321 and the procedure-being-used table 463 in the DBMS 421. As a result, the procedure name C is found cataloged in the procedure-being-used tables 363 and 463 and the procedure with the name C must therefore be made un-updatable in the DBMS 221.

A determination as to whether or not a procedure can be deleted is based on the state attribute of the procedure indicating whether or not the procedure is currently being used, being created or being updated. Thus, before deleting a procedure, it is necessary to refer to the procedure-being-used tables and the procedure-being-updated tables in all the DBMSes 221, 321 and 421 to find out whether or not the unique name of the procedure to be deleted has been cataloged in any of the tables. In the case of the DBMSes 221, 321 and 421 shown in FIG. 3, for example, deletion of the procedures with the names A, B, C and D must be disabled because the procedure names A, B, C and D have been cataloged in some of the tables.

The processes for forming a judgment as to whether or not a procedure can be created, used, updated or deleted which have been described roughly so far are explained in more detail by referring to FIGS. 4 to 7 as follows.

Figure 4:
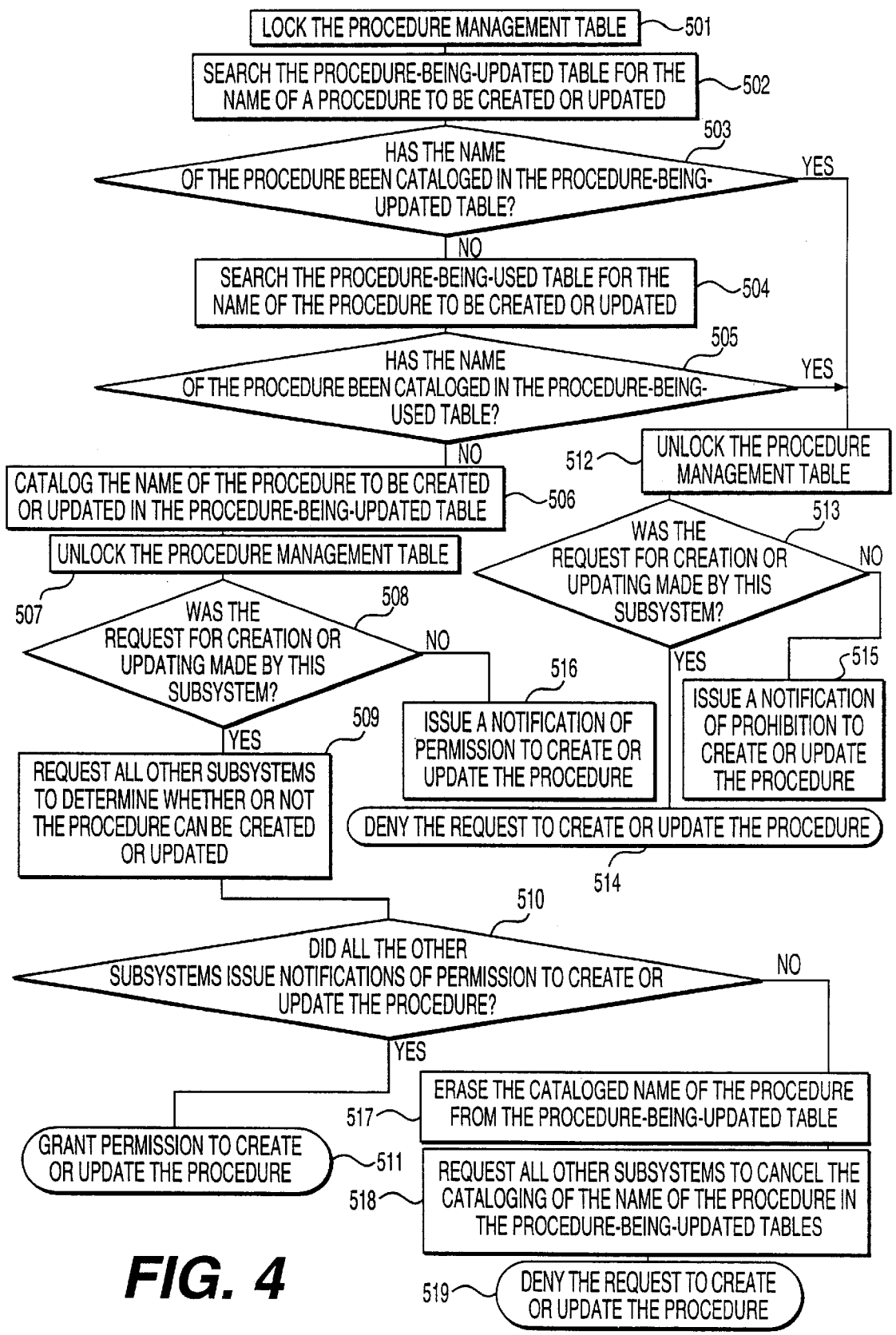
FIG. 4 is a diagram showing a flowchart of a procedural process for forming a judgment as to whether or not a procedure in the parallel processing system provided by the preferred embodiment can be created or updated.

FIG. 4 is a diagram showing a flowchart of a procedure for forming a judgment as to whether or not a procedure in the parallel processing system provided by the present embodiment can be created or updated. As shown in the figure, the flowchart begins with a step 501 at which the procedure management table pertaining to this DBMS is locked to disable accesses from other processing. The procedural flow then goes on to a step 502 to search the procedure-being-updated table of this DBMS for the name of a procedure to be created or updated. The procedural flow then goes to a step 503 to form a judgment as to whether the name of the procedure has been cataloged in the procedure-being-updated table. As a result of the search, if the name of the procedure is found cataloged in the procedure-being-updated table at the step 503, that is, if the outcome of the judgment made in step 503 is YES, the procedural flow goes on to a step 512 to unlock the procedure management table of this DBMS which was initially locked at the step 501 because the procedure in question is being created or updated by another program.

The procedural flow then proceeds to a step 513 to form a judgment as to whether or not the program requesting the processing to create or update the procedure pertains to the same subsystem as this DBMS. If the program requesting the processing to create or update the procedure pertains to the same subsystem as this DBMS, that is, if the outcome of the judgment formed at the step 513 is YES, the procedural flow continues to a step 514 to finally make a decision that the procedure cannot be created or updated, ending the processing. If the program requesting the processing to create or update the procedure does not pertain to the same subsystem as this DBMS, that is, if the outcome of the judgment formed at the step 513 is NO, on the other hand, the procedural flow goes on to a step 515 at which the DBMS of another subsystem requesting the processing to create or update the procedure is informed that the procedure cannot be created or updated, terminating the procedural process.

As a result of the search made at the step 502, if the name of the procedure is found not cataloged in the procedure-being-updated table at step 503, that is, if the outcome of the judgment made in step 503 is NO, on the other hand, the procedural flow goes on to a step 504 at which the procedure-being-used table of this DBMS is searched for the name of the procedure. The procedural flow then goes to a step 505 to form a judgment as to whether the name of the procedure has been cataloged in the procedure-being-used table. As a result of the search, if the name of the procedure is found cataloged in the procedure-being-used table at the step 505, that is, if the outcome of the judgment formed at the step 505 is YES, the procedural flow goes on to the step 512 to unlock the procedure management table of this DBMS which was initially locked at the step 501 because the procedure in question is currently being used by another program. The procedural flow then proceeds to the step 513 to form a judgment as to whether or not the program requesting the processing to create or update the procedure pertains to the same subsystem as this DBMS. If the program requesting the processing to create or update the procedure pertains to the same subsystem as this DBMS, that is, if the outcome of the judgment made in step 513 is YES, the procedural flow continues to the step 514 to finally make a decision that the procedure can not be created or updated, ending the processing. If the program requesting the processing to create or update the procedure does not pertain to the same subsystem as this DBMS, that is, if the outcome of the judgment formed at the step 513 is NO, on the other hand, the procedural flow goes on to the step 515 at which the DBMS of another subsystem requesting the processing to create or update the procedure is informed that the procedure can not be created or updated, terminating the procedural process, ending the processing.

As a result of the search made at the step 504, if the name of the procedure is found not cataloged in the procedure-being-used table at the step 504, that is, if the outcome of the judgment made in step 505 is NO, on the other hand, the procedural flow goes on to a step 506 at which the name of the procedure to be created or updated is cataloged in the procedure-being-updated table of this DBMS to indicate that the procedure will be created or updated by the requesting program. The procedural flow goes on to a step 507 to unlock the procedure management table of this DBMS which was initially locked at the step 501. The procedural flow then proceeds to a step 508 to form a judgment as to whether or not the program requesting the processing to create or update the procedure pertains to the same subsystem as this DBMS. If the program requesting the processing to create or update the procedure does not pertain to the same subsystem as this DBMS, that is, if the outcome of the judgment made in step 508 is NO, the procedural flow goes on to the step 516 at which the DBMS of another subsystem requesting the processing to create or update the procedure is informed that the procedure can be created or updated, terminating the procedural process.

If the program requesting the processing to create or update the procedure pertains to the same subsystem as this DBMS or if the judgment as to whether or not the procedure can be created or updated has been requested-by a program in the same subsystem as this DBMS, that is, if the outcome of the judgment formed at the step 508 is YES, on the other hand, the procedural flow continues to a step 509 at which the DBMSes of all the other subsystems are requested to carry out processing for forming a judgment as to whether or not the procedure can be created or updated. The procedural flow then goes on to a step 510 to examine notifications received from the DBMSes of the other subsystems, forming a judgment as to whether or not the procedure can be created or updated. If all the notifications received from the DBMSes of the other subsystems indicate that the procedure can be created or updated, that is, if the outcome of the judgment formed at the step 510 is YES, the procedural flow proceeds to a step 511 to make a final decision that the procedure can be created or updated, ending the processing.

If even only one of the notifications received from the DBMSes of the other subsystems indicates that the procedure cannot be created or updated, that is, if the outcome of the judgment formed at the step 510 is NO, on the other hand, the procedural flow proceeds to a step 517 to erase the name of the procedure to be created or updated from the procedure-being-updated table of the DBMS in which the name was cataloged at the step 506. The procedural flow then goes on to a step 518 at which the DBMSes of all the other subsystems are also requested to cancel the cataloging of the name of the procedure to be created or updated in their procedure-being-updated tables. The procedural flow proceeds to a step 519 to make a final decision that the procedure can not be created or updated, ending the processing.

Figure 5:
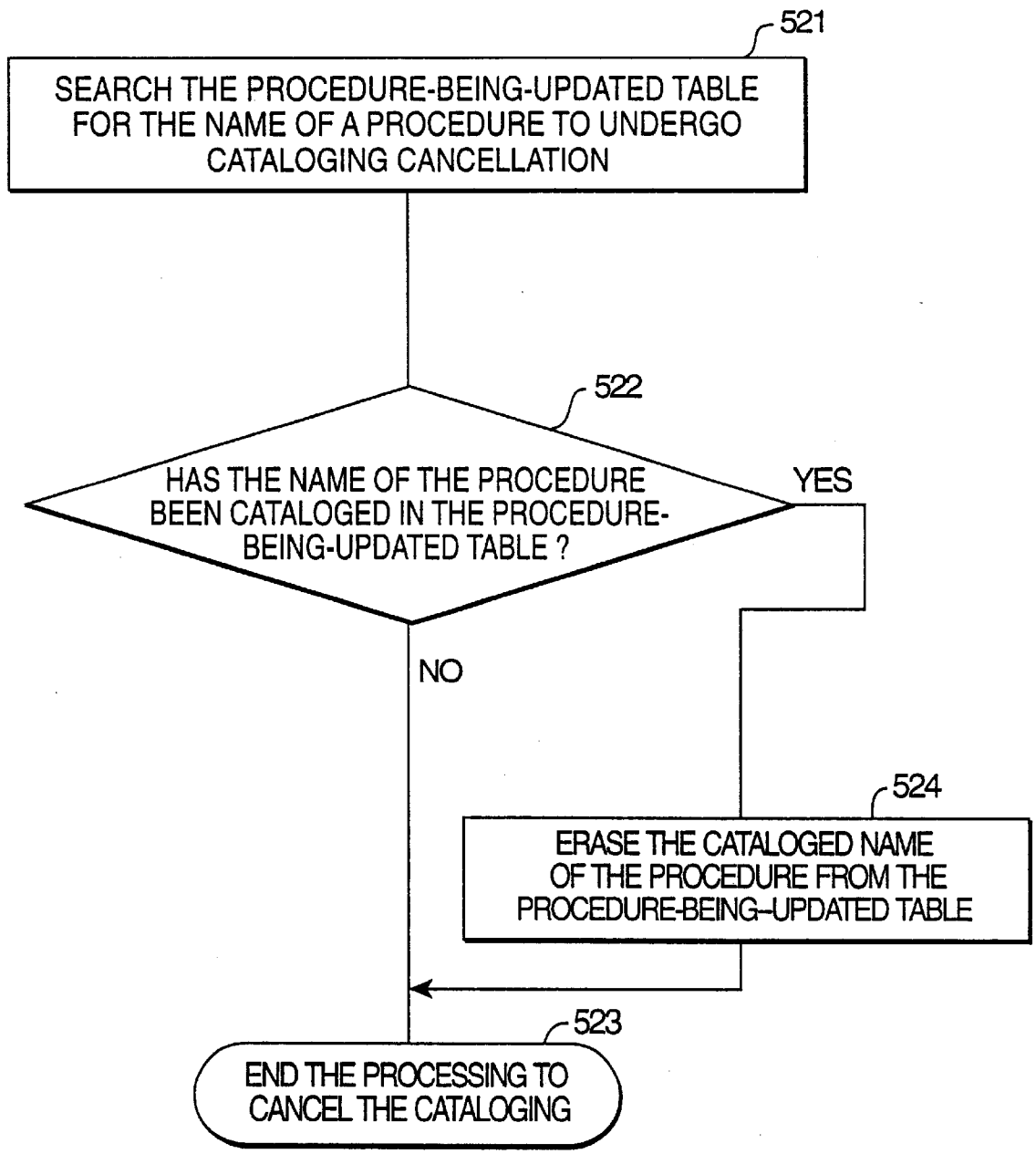
FIG. 5 is a diagram showing a flow chart of a procedural process to cancel the cataloging of the name of a procedure to be created or updated in the parallel processing system provided by the preferred embodiment.

FIG. 5 is a diagram showing a flow chart of a procedural process to cancel the cataloging of the name of the procedure to be created or updated in the parallel processing system provided by the present embodiment as requested in step 518, described above. As shown in the figure, the flowchart begins with a step 521 to search the procedure-being-updated table of this DBMS for a procedure name, the cataloging of which is to be canceled in response to the request for cancellation received from the DBMS of another subsystem. The procedural flow then goes on to a step 522 to form a judgment as to whether or not the name of the procedure has been cataloged. If the name of the procedure is found cataloged in the procedure-being-updated table, that is, if the outcome of the judgment made in step 522 is YES, the procedural flow proceeds to a step 524 in which the name of the procedure is erased from the procedure-being-updated table. The procedural flow then continues to a step 523 at which the processing to cancel the cataloging of the name of the procedure to be created or updated is terminated. If the name of the procedure is found not cataloged in the procedure-being-updated table yet, that is, if the outcome of the judgment made in step 522 is NO, on the other hand, the procedural flow proceeds directly to the step 523, skipping the step 524. The above processing is carried out to form a judgment as to whether or not any procedure can be created or updated and to control the status of procedures being created or updated.

Figure 6:
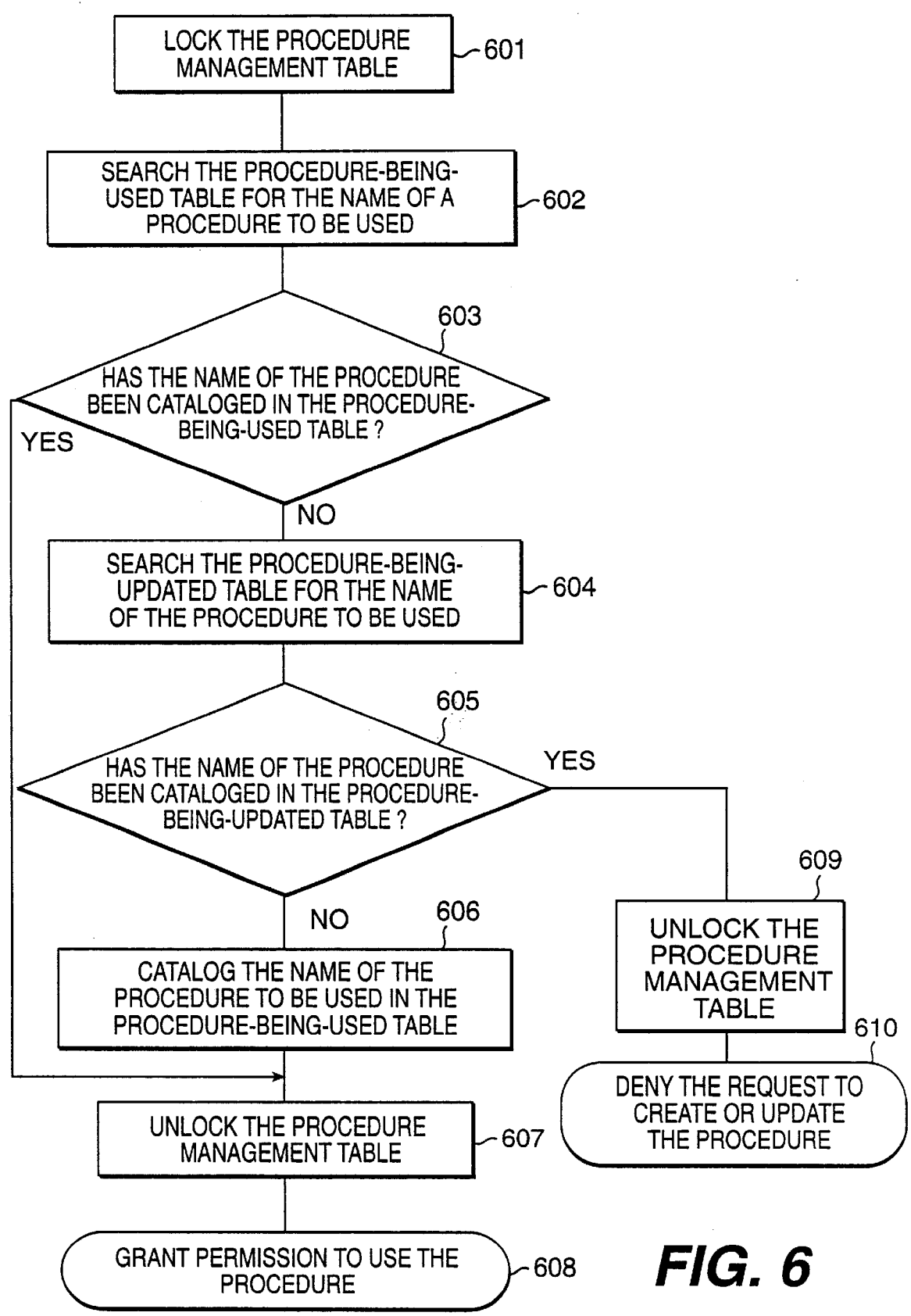
FIG. 6 is a diagram showing a flowchart of a procedural process for forming a judgment as to whether or not a procedure in the parallel processing system provided by the preferred embodiment can be used.

FIG. 6 is a diagram showing a flowchart of a procedural process for forming a judgment as to whether or not a procedure in the parallel processing system provided by the present embodiment can be used. As shown in the figure, the flowchart begins with a step 601 at which the procedure management table pertaining to this DBMS is locked to disable accesses from other processing. The procedural flow then goes on to a step 602 to search the procedure-being-used table of this DBMS for the name of a procedure to be used. The procedural flow then goes to a step 603 to form a judgment as to whether the name of the procedure has been cataloged in the procedure-being-used table. If the name of the procedure is found cataloged in the procedure-being-used table at the step 603, that is, if the outcome of the judgment formed at the step 603 is YES, the procedural flow goes on to a step 607 to unlock the procedure management table of this DBMS which was initially locked at the step 601 because permission to use the procedure in question has been granted to another program. The procedural flow then proceeds to a step 608 at which the permission to use the procedure in question at this time is granted to the requesting program as well, completing the processing.

As a result of the search made at the step 602, if the name of the procedure is found not cataloged in the procedure-being-used table at the step 603, that is, if the outcome of the judgment made in step 603 is NO, on the other hand, the procedural flow goes on to a step 604 at which the procedure-being-updated table of the DBMS is searched for the name of the procedure. The procedural flow then goes to a step 605 to form a judgment as to whether the name of the procedure has been cataloged in the procedure-being-updated table. As a result of the search, if the name of the procedure is found cataloged in the procedure-being-updated table at the step 605, that is, if the outcome of the judgment formed at the step 605 is YES, the procedural flow goes on to a step 609 to unlock the procedure management table of this DBMS which was initially locked at the step 601 because the procedure in question is currently being created or updated by another program. The procedural flow then proceeds to a step 610 to make a final decision that the procedure cannot be used, completing the processing.

As a result of the search made at the step 604, if the name of the procedure is found not cataloged in the procedure-being-used table in step 605, that is, if the outcome of the judgment made in step 605 is NO, on the other hand, the procedural flow goes on to a step 606 at which the name of the procedure to be used is cataloged in the procedure-being-used table of this DBMS to indicate that the procedure will be used by the requesting program. The procedural flow goes on to a step 607 to unlock the procedure management table of this DBMS which was initially locked at the step 601. And then, the procedural flow proceeds to the step 608 at which the permission to use the procedure in question is granted to the requesting program, ending the processing. The above processing is carried out to form a judgment as to whether or not any procedure can be created or updated and to control the status of procedures being created or updated.

Figure 7:
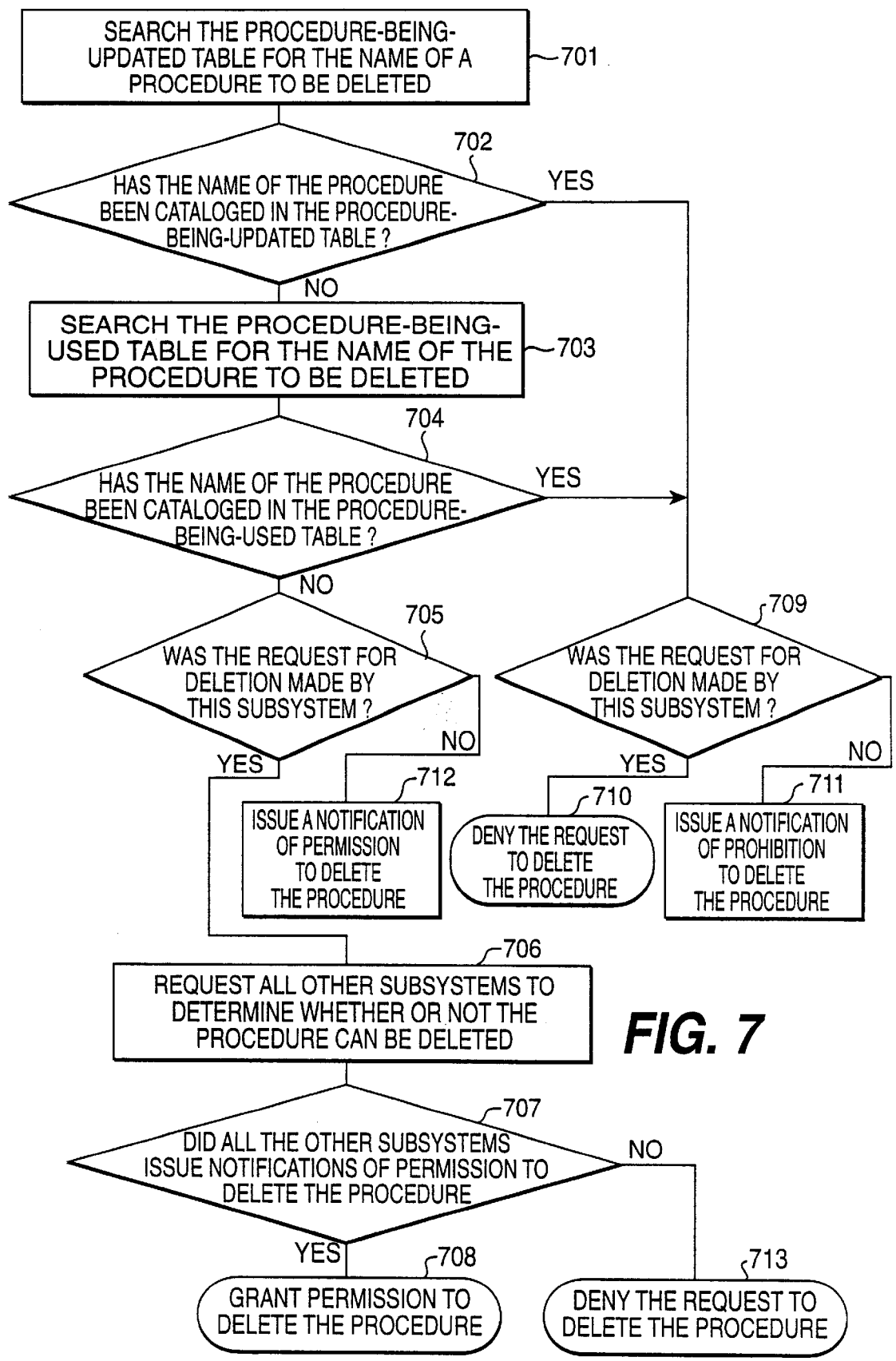
FIG. 7 is a diagram showing a flowchart of a procedural process for forming a judgment as to whether or not a procedure in the parallel processing system provided by the preferred embodiment can be deleted.

FIG. 7 is a diagram showing a flowchart of a procedural process for forming a judgment as to whether or not a procedure in the parallel processing system provided by the present embodiment can be deleted. When a procedure is deleted, exclusive control is executed on the data management information storage unit in which all kinds of information on the procedure to be deleted is stored and, no processing to create, use or update the procedure is carried out at the same time. It is thus not necessary to lock the procedure management table in particular.

As shown in the figure, the flowchart begins with a step 701 to search the procedure-being-updated table of this DBMS for the name of a procedure to be deleted. The procedural flow then goes to a step 702 to form a judgment as to whether the name of the procedure has been cataloged in the procedure-being-updated table. As a result of the search, if the name of the procedure is found cataloged in the procedure-being-updated table at the step 702, that is, if the outcome of the judgment formed at the step 702 is YES, the procedural flow goes on to a step 709 to form a judgment as to whether or not the program requesting the processing to delete the procedure pertains to the same subsystem as this DBMS. If the program requesting the processing to delete the procedure pertains to the same subsystem as this DBMS, that is, if the outcome of the judgment formed at the step 709 is YES, the procedural flow continues to the step 710 to finally make a decision that the procedure cannot be deleted because the procedure is currently being updated or created by another program, ending the processing. If the program requesting the processing to delete the procedure does not pertain to the same subsystem as this DBMS, that is, if the outcome of the judgment formed at the step 709 is NO, on the other hand, the procedural flow goes on to the step 711 at which the DBMS of another subsystem requesting the processing to delete the procedure is informed that the procedure can not be deleted, terminating the procedural process.

As a result of the search made at the step 701, if the name of the procedure is found not cataloged in the procedure-being-updated table at the step 702, that is, if the outcome of the judgment made in step 702 is NO, on the other hand, the procedural flow goes on to a step 703 at which procedure-being-used table of this DBMS is searched for the name of the procedure to be deleted. The procedural flow then goes on to a step 704 to form a judgment as to whether the name of the procedure to be deleted has been cataloged in the procedure-being-used table of this DBMS. If the name of the procedure to be deleted is found cataloged in the procedure-being-used table of this DBMS, that is, if the outcome of the judgment formed at the step 704 is YES, the procedural flow proceeds to the step 709 to form a judgment as to whether or not the program requesting the processing to delete the procedure pertains to the same subsystem as this DBMS. If the program requesting the processing to delete the procedure pertains to the same subsystem as this DBMS, that is, if the outcome of the judgment formed at the step 709 is YES, the procedural flow continues to the step 710 to finally make a decision that the procedure cannot be deleted because the procedure is currently being used by another program, ending the processing. If the program requesting the processing to delete the procedure does not pertain to the same subsystem as this DBMS, that is, if the outcome of the judgment formed at the step 709 is NO, on the other hand, the procedural flow goes on to the step 711 at which the DBMS of another subsystem requesting the processing to delete the procedure is informed that the procedure can not be deleted, terminating the procedural process.

As a result of the search made at the step 703, if the name of the procedure is found not cataloged in the procedure-being-used table at the step 704, that is, if the outcome of the judgment formed at the step 704 is NO, on the other hand, the procedural flow goes on to the step 705 to form a judgment as to whether or not the program requesting the processing to delete the procedure pertains to the same subsystem as this DBMS. If the program requesting the processing to delete the procedure does not pertain to the same subsystem as this DBMS, that is, if the outcome of the judgment formed at the step 705 is NO, the procedural flow, goes on to the step 712 at which the DBMS of another subsystem requesting the processing to delete the procedure is informed that the procedure can be deleted, terminating the procedural process.

If the program requesting the processing to delete the procedure pertains to the same subsystem as this DBMS or if the judgment as to whether or not the procedure can be created or updated has been requested by a program in the same subsystem as this DBMS, that is, if the outcome of the judgment made in step 705 is YES, on the other hand, the procedural flow continues to the step 706 at which the DBMSes of all the other subsystems are requested to carry out processing for forming a judgment as to whether or not the procedure can be deleted. The procedural flow then goes on to a step 707 to examine notifications received from the DBMSes of all the other subsystems, forming a judgment as to whether or not the procedure can be deleted. If all the notifications received from the DBMSes of the other subsystems indicate that the procedure can be deleted, that is, if the outcome of the judgment formed at the step 707 is YES, the procedural flow proceeds to a step 708 to make a final decision that the procedure can be deleted, ending the processing. If even only one of the notifications received from the DBMSes of the other subsystems indicates that the procedure cannot be deleted, that is, if the outcome of the judgment formed at the step 707 is NO, on the other hand, the procedural flow proceeds to a step 713 to make a final decision that the procedure can not be deleted, ending the processing. By carrying out the processing described above, it is possible to make a decision as to whether or not any procedure can be deleted.

By using the parallel processing system provided by the embodiment described above, the processes of creation, use, updating and deleting procedures can be carried out concurrently at the subsystems, distributing the time to wait till the exclusive control of the procedure management table is released. In this way, the number of requests made to another subsystem to make a judgment as to whether or not the creation, use, updating or deletion of a procedure is allowable can be reduced. In addition, the frequency at which the execution of a program is suspended during the time to wait for a response to the request from another subsystem can also be reduced. It is thus possible to eliminate the concentration of processing loads at a particular subsystem and a bad effect on the turn-round time of the program. As a result, the processing efficiency of the parallel processing system can be maintained at a high level and, even if a subsystem has to suspend its function, the effect of the suspension on the operation of the parallel processing system as a whole can be avoided.

As described in detail so far, according to the parallel processing system provided by the embodiment described above, with respect to the to create, use, update and delete procedures, the number of requests made to another subsystem to make a judgment as to whether or not the creation, use, updating or deletion of a procedure is allowable can be decreased. In addition, the frequency at which the execution of a program is suspended during the time to wait for a response to the request from another subsystem can also be reduced. It is thus possible to eliminate the concentration of processing loads at a particular subsystem and the adverse effects on the turn-round time of the program. As a result, the processing efficiency of the parallel processing system can be maintained at a high level and, even if a subsystem has to suspend its function, the effect of the suspension on the operation of the parallel processing system as a whole can be avoided.

We claim:

1. A parallel processing system comprising a plurality of subsystems communicating with each other to operate as a single system, comprising:

said subsystems each having a variety of procedures that are selectively created, used, updated and deleted by a program in execution and a procedure management unit that controls state attributes of the procedures;

wherein said procedure management unit includes a procedure-being-used table for cataloging names of procedures currently being used by programs in execution and a procedure-being-updated table for cataloging names of procedures currently being created or updated by programs in execution;

wherein, in response to a request to create, update or delete a procedure from a program in execution, said procedure management unit pertaining to a particular one of said subsystems grants permission to create, update or delete said procedure to said program only if the name of said procedure is not cataloged in said procedure-being-updated table of said procedure management unit pertaining to said particular subsystem and also is not cataloged in said procedure-being-used table of said procedure management units of the remaining ones of said subsystems; and wherein, in response to a request to use a procedure from a program in execution, said procedure management unit pertaining to a particular one of said subsystems grants permission to use said procedure to said program only if the name of said procedure is not cataloged in said procedure-being-updated table of said procedure management unit pertaining to said particular subsystem.

2. A parallel processing system comprising a plurality of subsystems communicating with each other to operate as a single system, comprising:

said subsystems each having a database management system (DBMS) that are connected to each other to form a relational database;

each of said subsystems further having a variety of procedures that are selectively created, used, updated and deleted by a program in execution and a procedure management unit that controls state attributes of the procedures;

wherein said procedure management unit includes a procedure-being-used table for cataloging names of procedures currently being used by programs in execution and a procedure-being-updated table for cataloging names of procedures currently being created or updated by programs in execution;

wherein, a plurality of disk drives are connected to said DBMS of said subsystems and further each of said subsystems is connected to a central data management information storage unit for integral control of the relational database;

wherein, in response to a request to create, update or delete a procedure from a program in execution, said procedure management unit pertaining to a particular one of said subsystems grants permission to create, update or delete said procedure to said program only if the name of said procedure is not cataloged in said procedure-being-updated table of said procedure management unit pertaining to said particular subsystem and also is not cataloged in said procedure-being-used table of said procedure management units of the remaining ones of said subsystems; and wherein control information for accessing said disk drives is stored in said central data management information storage unit.

3. A parallel processing system comprising a plurality of subsystems communicating with each other to operate as a single system, comprising:

said subsystems each having a database management system (DBMS) that are connected to each other to form a relational database;

each of said subsystems further having a variety of procedures that are selectively created, used, updated and deleted by a program in execution and a procedure management unit that controls state attributes of the procedures;

wherein said procedure management unit includes a procedure-being-used table for cataloging names of procedures currently being used by programs in execution and a procedure-being-updated table for cataloging names of procedures currently being created or updated by programs in execution;

wherein, a plurality of disk drives are connected to said DBMS of said subsystems and further each of said subsystems is connected to a central data management information storage unit for integral control of the relational database;

wherein, in response to a request to create, update or delete a procedure from a program in execution, said procedure management unit pertaining to a particular one of said subsystems grants permission to create, update or delete said procedure to said program only if the name of said procedure is not cataloged in said procedure-being-updated table of said procedure management unit pertaining to said particular subsystem and also is not cataloged in said procedure-being-used table of said procedure management units of the remaining ones of said subsystems; and wherein, in response to a request to use a procedure from a program in execution, said procedure management unit pertaining to a particular one of said subsystems grants permission to use said procedure to said program only if the name of said procedure is not cataloged in said procedure-being-updated table of said procedure management unit pertaining to said particular subsystem.

4. A parallel processing system comprising a plurality of subsystems communicating with each other to operate as a single system, comprising:

said subsystems each having a database management system (DBMS) that are connected to each other to form a relational database;

each of said subsystems further having a variety of procedures that are selectively created, used, updated and deleted by a program in execution and a procedure management unit that controls state attributes of the procedures;

wherein said procedure management unit includes a procedure-being-used table for cataloging names of procedures currently being used by programs in execution and a procedure-being-updated table for cataloging names of procedures currently being created or updated by programs in execution;

wherein, a plurality of disk drives are connected to said DBMS of said subsystems and further each of said subsystems is connected to a central data management information storage unit for integral control of the relational database;

wherein, in response to a request to create, update or delete a procedure from a program in execution, said procedure management unit pertaining to a particular one of said subsystems grants permission to create, update or delete said procedure to said program only if the name of said procedure is not cataloged in said procedure-being-updated table of said procedure management unit pertaining to said particular subsystem and also is not cataloged in said procedure-being-used table of said procedure management units of the remaining ones of said subsystems; and wherein each of said DBMSes has a data searching system that accesses said plurality of disks.

5. A method of parallel processing in a system comprising a plurality of subsystems communicating with each other to operate as a single system, comprising the steps of:

executing a program that selectively uses, updates, creates and deletes a variety of procedures;

controlling state attributes of the procedures; cataloging names of procedures in a procedure-being-used table when procedures are currently being used by the programs in execution and cataloging names of procedures in a procedure-being-updated table when procedures are currently being created or updated by programs in execution; and wherein, in response to a request to create, update or delete a procedure from a program in execution, granting permission to create, update or delete one said procedure to said program only if the name of said procedure is not cataloged in said procedure-being-updated table of one said subsystem that invokes the request and also is not cataloged in said procedure-being-used table of said remaining ones of said subsystems and;

wherein, in response to a request to use a procedure from a program in execution, granting permission to use said procedure to said program only if the name of said procedure is not cataloged in said procedure-being-updated table pertaining to said one subsystem.

6. A method of parallel processing in a system comprising a plurality of subsystems communicating with each other to operate as a single system, comprising the steps of:

executing a program that selectively uses, updates, creates and deletes a variety of procedures;

connecting database management systems (DBMSes) in each of said subsystems to each other to form a relational database;

controlling state attributes of the procedures; and cataloging names of procedures in a procedure-being-used table when procedures are currently being used by the programs in execution and cataloging names of procedures in a procedure-being-updated table when procedures are currently being created or updated by programs in execution;

wherein, in response to a request to create, update or delete a procedure from a program in execution, a procedure management unit pertaining to a particular one of said subsystems grants permission to create, update or delete said procedure to said program only if the name of said procedure is not cataloged in said procedure-being-updated table of said procedure management unit pertaining to said particular subsystem and also is not cataloged in said procedure-being-used table of procedure management units of the remaining ones of said subsystems.

7. A parallel processing method according to claim 6, further including connecting a plurality of disk drives to said DBMSes of said subsystems and controlling said relational database with a central data management information storage unit connected to said subsystems.

8. A parallel processing method system according to claim 7, further including storing information concerning accessing said disk drives in said central data management information storage unit.

9. A parallel processing method according to claim 8, wherein said plurality of disks is accessed by a data searching system of each said DBMS.

\* \* \* \* \*